United States Patent [19]

Birgmeir et al.

[11] Patent Number: 4,831,436
[45] Date of Patent: May 16, 1989

[54] METHOD OF AND APPARATUS FOR PRINTING A COLOR IMAGE USING DICHROIC FILTERS AND A PHOSPHOR WHICH STRONGLY EMITS RED LIGHT AND WEAKLY EMITS GREEN AND BLUE LIGHT

[75] Inventors: Klaus Birgmeir, Putzbrunn; Eduard Wagensonner, Aschheim, both of Fed. Rep. of Germany

[73] Assignee: Agfa-Gevaert Aktiengesellschaft, Leverkusen, Fed. Rep. of Germany

[21] Appl. No.: 85,859

[22] Filed: Aug. 14, 1987

[30] Foreign Application Priority Data

Aug. 29, 1986 [DE] Fed. Rep. of Germany ....... 3629416

[51] Int. Cl.$^4$ .......................... H04N 1/46; H04N 5/84; G03F 3/08
[52] U.S. Cl. ........................................ 358/75; 358/80; 358/244
[58] Field of Search ................ 358/75, 80, 244, 244.1, 358/244.2, 332, 345

[56] References Cited

U.S. PATENT DOCUMENTS

| 4,438,453 | 3/1984 | Alston | 358/75 |
| 4,473,849 | 9/1984 | Coul | 358/332 |
| 4,708,448 | 11/1987 | Urabe | 358/244 |
| 4,780,756 | 10/1988 | Shiota et al. | 358/75 |

FOREIGN PATENT DOCUMENTS 58-12247 1/1983 Japan ...................... 358/75

OTHER PUBLICATIONS

M. A. Durkin, "An Experimental Cathode—Ray Tube Printer", *Journal Of Imaging Technology*, vol. 12, No. 3, Jun. 1986, pp. 135–139.

*Primary Examiner*—James J. Groody
*Assistant Examiner*—Randall S. Svihla
*Attorney, Agent, or Firm*—Peter K. Kontler

[57] ABSTRACT

A colored original is scanned in each of the three primary colors red, green and blue to generate a series of electrical imaging signals for each such color. The signals are electronically processed and then sent to a cathode ray tube having a screen which is coated with a phosphor. The cathode ray tube successively converts the signals of the different series into optical images having the respective primary colors red, green and blue. The images are formed on the screen of the cathode ray tube thereby exciting the phosphor which luminesces to generate printing light. The differently colored images are successively printed on photographic color paper using the printing light emitted by the phosphor as well as respective red, green and blue filters. The phosphor is a rare earth phosphor which emits strongly in the red region of the spectrum and only weakly in the green and blue regions of the spectrum. The weak emissions in the green and blue regions of the spectrum are compensated for by using dichroic green and blue filters having high transmissivities. On the other hand, the strong emission of the phosphor in the red region of the spectrum is balanced by employing copy paper having relatively low sensitivity in this region. Such compensation and balancing make it possible to achieve equal or almost equal exposure times in the different primary colors.

32 Claims, 6 Drawing Sheets

METHOD OF AND APPARATUS FOR PRINTING A COLOR IMAGE USING DICHROIC FILTERS AND A PHOSPHOR WHICH STRONGLY EMITS RED LIGHT AND WEAKLY EMITS GREEN AND BLUE LIGHT

BACKGROUND OF THE INVENTION

The invention relates generally to the reproduction of originals.

More particularly, the invention relates to a method and apparatus for the printing of colored originals.

It is known to scan a colored original along rows and columns, or point-by-point, and to generate electrical imaging signals based on the scanning operation. The signals are divided into three series respectively corresponding to the red, green and blue components of the original. The signals are processed and then converted into an optical image by means of a cathode ray tube having a screen which is coated with a phosphor. The phosphor emits radiation which is focused on negative color copy material having relatively low sensitivity in the red region of the spectrum via an objective. The copy material is successively exposed to the red, green and blue components of the image by successively moving three color filters into the path of the radiation travelling from the phosphor to the copy material.

Electronic image processing, that is, processing of the electrical imaging signals generated upon scanning an original, is being increasingly used in the reproduction of colored originals and the production of colored photographic positives from colored negatives. Here, the original is electronically scanned along rows and columns, or point-by-point, and the resulting electrical imaging signals are corrected or modified in accordance with specific criteria. The modified imaging signals are sent to a color exposure unit which converts the electrical imaging signals into an optical image for printing on photographic copy material, e.g., color negative paper. An apparatus for carrying out a procedure of this type is disclosed, for instance, in "An Experimental Cathode Ray Tube Printer", Journal of Imaging Technology, Vol. 12, No. 3, pp. 135-139. In this apparatus, the electrical imaging signals are converted into an optical image by means of a cathode ray tube having a screen coated with substances capable of emitting radiation for printing of the image. These substances include a phosphor of the type known as P 45 and yttrium sulfide doped with europium. Approximately one-quarter of the printing light is generated by the phosphor while 74% is generated by the yttrium sulfide. The resulting emission spectrum has distinct peaks of different amplitudes over the range of 380 to 720 nm. During printing, different color filters are successively moved into the path of the printing light. The filters employed in the known apparatus are gelatin filters having transmission patterns with relatively flat sides and exhibiting significant residual radiation absorption even in wavelength ranges corresponding to those colors for which the filters possess maximum transmissivity.

Due to the differing sensitivities of the copy material in the basic or primary colors, the emission pattern of the phosphor and the absorption characteristics of the filters, the amounts of printing light required in the individual colors for an original of average coloration differ significantly. In principle, it is possible to increase the brightness or intensity of an image point on the screen of the cathode ray tube by increasing the current in the cathode. However, such increase in intensity is limited because the tube may become overloaded at high light intensities and, in addition, the size of an image point increases with increasing intensity thereby reducing image sharpness. In practice, uniformly intense light emission throughout all wavelength ranges cannot be achieved with a single phosphor so that mixtures of phosphors must be created for this purpose. Aside from the sharply increased cost of a tube capable of providing this result, mixtures of phosphors have the further disadvantage that the various components age differently. Consequently, the intensities of the emissions in the different colors change in different ways during the life of the tube.

If the greatly differing amounts of printing light in the known apparatus are achieved by controlling the exposure time only, the exposure times become relatively long with an accompanying reduction in copier output.

OBJECTS AND SUMMARY OF THE INVENTION

It is an object of the invention to provide a printing method which allows copier output to be increased.

Another object of the invention is to provide a printing method which makes it possible to reduce differences between the exposure times for the different primary colors.

An additional object of the invention is to provide a printing method capable of achieving exposure times for the different primary colors which do not differ excessively while, at the same time, allowing relatively high copier output and good image quality to be obtained.

A further object of the invention is to provide a printing apparatus which enables relatively high output to be achieved.

It is also an object of the invention to provide a printing apparatus which permits differences between the exposure times for the different primary colors to be reduced.

Yet another object of the invention is to provide a printing apparatus which allows relatively high output and good image quality to be obtained and is further capable of establishing exposure times for the different primary colors which do not differ unduly.

The preceding objects, as well as others which will become apparent as the description proceeds, are achieved by the invention.

One aspect of the invention resides in a method of printing a colored image. The method comprises generating printing light having high intensity in the red region of the spectrum and low intensity in the blue and green regions of the spectrum. The printing light is directed along a predetermined path, e.g., by means of an objective, and is filtered in a first portion of the path having high transmissivity in the blue or green region of the spectrum. The printing light is then caused to impinge upon copy material, e.g., commercially available negative color copy material, having relatively low sensitivity in the red region of the spectrum in a second portion of the path downstream of the first portion.

The image to be printed may be formed from electrical imaging signals obtained during electrooptical scanning of an original. The signals may be divided into three series respectively corresponding to the red, green and blue components of the image. The operation of forming the image involves conversion of the electrical imaging signals into optical information or data. This may be accomplished, for instance, using a cathode ray tube. The step of forming the image may be performed along rows and columns or point-by-point.

The step of generating the printing light is preferably performed by effecting luminescence of a conventional rare earth phosphor which emits strongly in the red region of the spectrum and weakly in the blue and green regions of the spectrum. The phosphor may have one or more emission peaks in the red region, and the emission intensities in the blue and green regions advantageously do not exceed one-thirtieth of the intensity in the red region. The emission peaks in the blue and green regions of the phosphor employed in accordance with the invention are not shown in the usual data sheets. The phosphor may be coated on the screen of the cathode ray tube and luminescence of the phosphor may be effected by exciting the phosphor with the cathode ray beam.

The filtering operation may be dichroic and may involve successively filtering the printing light in the primary or basic colors red, green and blue. This may be accomplished by means of three dichroic color filters which are successively moved into the path of the printing light. Two of these filters may be designed to respectively have high transmissivities in the green and blue regions of the spectrum.

By virtue of the strong emission of the phosphor in the red region of the spectrum, the invention allows the exposure time for the red component of the image to be shortened considerably as compared to conventional methods and apparatus. Simultaneously, the employment of dichroic color filters having high transmissivities in the green and blue regions of the spectrum permits the transmissivity of the optical path to be maximized for these colors. Since the sensitivity of the copy material to green and blue radiation is 20 to 50 times greater than that to red radiation, it is thus possible, without changing the brightness of intensity of the image on the screen of the cathode ray tube, to obtain exposure times for the green and blue components which approximately equal the exposure time for the red component. This may be achieved in spite of the fact that the green and blue emissions of the phosphor used by the invention are hardly noticeable on the usual emission curves. Inasmuch as modulation of the cathode ray tube may be kept virtually constant, the sizes of the image points in the three primary colors may be maintained essentially equal. This makes it possible to avoid colored rims around the centers of the image points which can be especially disturbing in gray areas of average density.

Another aspect of the invention resides in an apparatus for printing a colored image. The apparatus comprises means for generating printing light having high intensity in the red region of the spectrum and low intensity in the blue and green regions of the spectrum. The generating means may, for instance, include a cathode ray tube having a screen, and a phosphor which emits strongly in the red region of the spectrum and weakly in the blue and green regions of the spectrum coated on the screen. The apparatus further comprises means, e.g., an objective, for directing the printing light along a predetermined path, and means for filtering the printing light in such path. The filtering means may, for example, include a plurality of color filters which are selectively movable into and out of the path. The apparatus also comprises means downstream of the filtering means for accommodating copy material, e.g., negative color copy material.

The apparatus may additionally comprise a source of three series of electrical imaging signals respectively corresponding to the red, green and blue components of the image, and the generating means may be designed to convert these signals into optical information or data. Advantageously, the generating means is operative to convert the electrical imaging signals into optical information along rows and columns or point-by-point.

The emission intensity of the phosphor in the blue and green regions of the spectrum is preferably no greater than about one-thirtieth of the emission intensity in the red region of the spectrum. The emission peaks of such a phosphor in the blue and green regions are not illustrated in the usual data sheets. Preferred phosphors include P 22 R and P 56.

The copy material used in the apparatus of the invention preferably has relatively low sensitivity in the red region of the spectrum while the filtering means preferably has high transmissivity in the green and blue regions of the spectrum. The filtering means advantageously includes green and blue filters which are dichroic and have high transmissivities in the green and blue regions, respectively.

The apparatus of the invention is particularly well-suited for carrying out the method according to the invention.

The novel features which are considered as characteristic of the invention are set forth in particular in the appended claims. The improved printing method itself, however, as well as the construction and mode of operation of the improved printing apparatus, together with additional features and advantages of the method and apparatus, will be best understood upon perusal of the following detailed description of certain specific embodiments with reference to the accompanying drawings.

DESCRIPTION OF THE PREFERRED EMBODIMENTS

Figure 1:
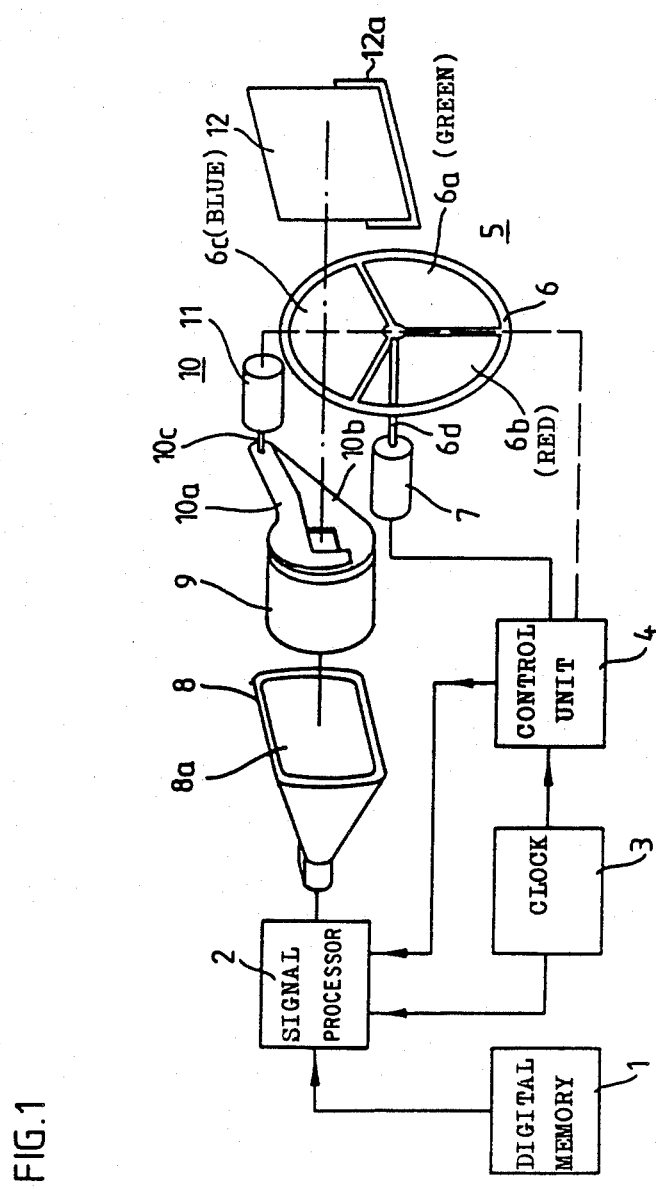
FIG. 1 diagrammatically illustrates certain components of a printing apparatus in accordance with the invention.

The printing or copying apparatus shown in FIG. 1 includes a source 1 of digital electrical imaging signals representing the image of a colored original to be reproduced. The source 1 is advantageously constituted by a digital memory which functions to store the imaging signals. The imaging signals stored in the memory 1 include three series of signals each of which corresponds to one of the primary color components of the image, that is, the three series of signals respectively correspond to the red, green and blue components of the image.

It is here assumed that the imaging signals were obtained by electronically or electrooptically scanning the original along rows and columns. It is further assumed that the scanner used for the scanning operation is designed to scan the original at a series of discrete points along each row and column, i.e., the scanner is designed to scan the original point-by-point. It is also assumed that every point of the original was scanned in each of the primary colors red, green and blue so that three imaging signals respectively corresponding to the red, green and blue color components were generated for each point of the original. Based on these assumptions, each of the signals in the memory 1 is associated with a specific point of the original and its image. Such points will be referred to as image points.

The memory 1 is connected to a signal processor 2, and the digital signals stored in the memory 1 may be recalled from the latter and sent to the signal processor 2 in the form of a stream and at a rate conforming to the printing speed. Alternatively, the signals may arrive at the signal processor 2 directly from the scanner via an electronic image processing unit. The signal processor 2 transforms the signals into a form suitable for exposure of copy material, that is, the signal processor 2 processes the signals so that the image points on the copy to be made have precisely the proper color and density after development.

The signal processor 2 is connected to a central clock or timer 3 which regulates the timing of the printing or copying operation. The signal processor 2 is further connected to a control unit 4 which serves to control a printing filter unit 5. The filter unit 5 includes a filter disc 6 having three colored sections 6a,6b,6c each of which subtends an arc of 120°. The section 6a constitutes a green filter, the section 6b a red filter and the section 6c a blue filter. The filter disc 6 is fast with a rotatable shaft 6d driven by a motor 7. The motor 7 is conventionally controlled by the control unit 4 in such a manner that, during exposure of the copy material to radiation in a particular primary color, the filter of the same color is located in the path of the printing light (also referred to herein as the optical path), e.g., the green filter is disposed in the optical path when the copy material is exposed to green light representing the green component of the image.

The signal processor 2 has an output which is connected to the inputs of an imaging device or means for generating printing light. The imaging device is here in the form of a cathode ray tube 8 of known design. The cathode ray tube 8 has a screen 8a coated with a phosphor possessing characteristics to be described in more detail below. The beam of the cathode ray tube 8 functions to excite the phosphor which then luminesces and emits printing light. The light emitted by the phosphor is used for exposure of the copy material in all three primary colors.

In addition to its function of generating printing light, the cathode ray tube 8 serves as a means for converting the electrical imaging signals in the memory 1 into an optical image which appears on the screen 8a. The cathode ray tube 8 converts the imaging signals into the optical image by rows and columns or point-by-point just as the imaging signals were derived by scanning the original at discrete points along rows and columns. The screen 8a of the cathode ray tube 8, as well as the optical image formed on the screen 8a, are focused on photographic copy paper or copy material 12 by means of an objective 9. The objective 9 may be considered to constitute a means, or part of a means, for directing the printing light emitted by the phosphor on the screen 8a along a predetermined path, namely, the optical path. The copy material 12, which is here assumed to be negative color copy material, is accommodated by a holder 12a.

Immediately adjacent to the objective 9 is a diaphragm or shutter 10 serving as a means for regulating the intensity of the printing light in the optical path. The shutter 10 may take on different forms but, for the sake of simplicity, is here shown as a twin-bladed shutter with two blades or vanes 10a,10b. The blades 10a,10b are connected to a motor 11 via a shaft 10c, and the motor 11 functions to move the blades 10a,10b into respective positions determined by the control unit 4.

Figure 2:
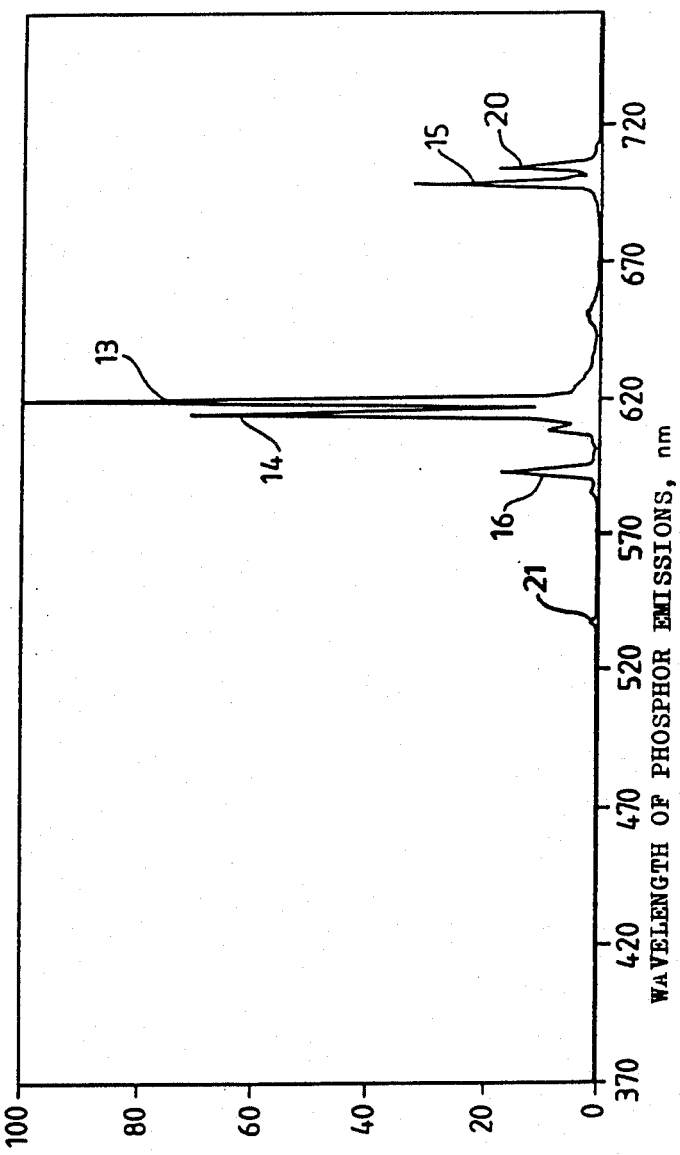
FIG. 2 shows the emission spectrum of a phosphor for use in the apparatus of FIG. 1.

FIG. 2 illustrates an emission spectrum for the phosphor on the screen 8a of the cathode ray tube of FIG. 1. The abscissa in FIG. 2 represents the wavelength of the phosphor emissions, i.e., the wavelength of the light emitted by the phosphor, in nanometers (nm) over the wavelength range of 370 to 720 nm while the ordinate represents, in percent, the intensity of an emission, or the magnitude of an emission peak, relative to the intensity of the strongest emission of the phosphor. The phosphor employed in the cathode ray tube 8 is a rare earth phosphor which emits strongly in the red region of the spectrum and weakly in the blue and green regions of the spectrum. Such phosphors are frequently marketed under the designations P 22 R and P 56. The intensities of the emissions in the blue and green regions of the spectrum are at most one-thirtieth of the intensity in the red region, and the emission peaks in the blue and green regions are not shown on conventional data sheets.

The strongest emission of the phosphor of FIG. 2 occurs at 620 nm as indicated by the emission peak 13. A second emission peak 14 is located adjacent to the peak 13 at 615 nm and has a relative intensity of 70%. The emission peak 14 corresponds to the second strongest emission of the phosphor. The next strongest emission is at 695 nm as indicated by the emission peak 15. A somewhat smaller emission peak 20 representing a relative intensity of 20% is disposed next to the peak 15. A further emission peak 16 corresponding to a relative intensity of approximately 18% is located at 595 nm. Each of the peaks 13,14,15,16,20 is disposed in the red region of the spectrum.

An extremely small peak 21 is observable in the green region of the spectrum at about 538 nm. There are no observable emission peaks in the blue region below 480 nm.

The phosphor of FIGS. 1 and 2 is free of other phosphors such as, for example, white phosphors.

Figure 3:
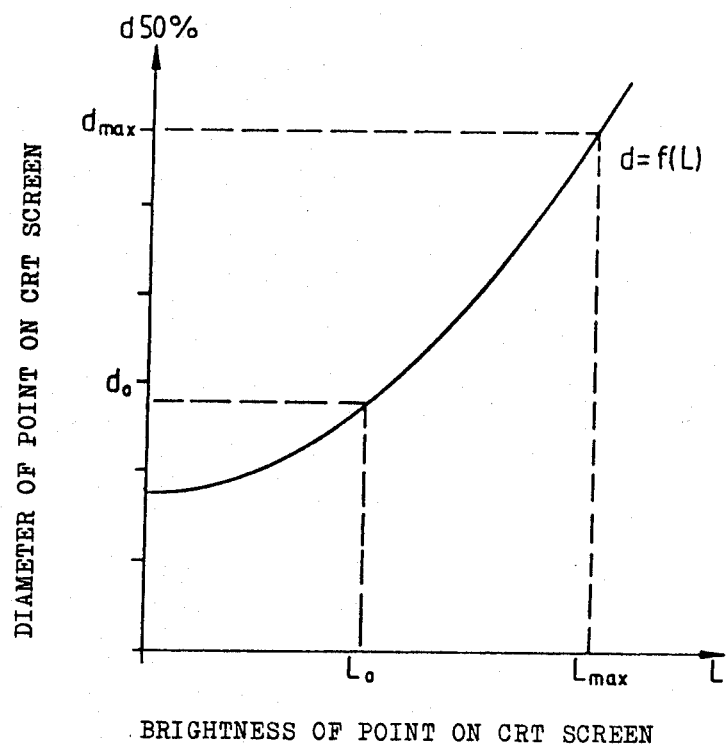
FIG. 3 illustrates the relationship between the intensity of an image point on a cathode ray tube constituting part of the apparatus of FIG. 1 and the size of the image point.

FIG. 3 is a plot of the diameter d of an image point on the screen 8a of the cathode ray tube 8 as a function of the brightness or intensity L of the point. It will be observed that the relationship between d and L is represented by a shifted curve or function $d = f(L)$ which is approximately parabolic, and that the diameter d increases with increasing brightness L. In the range of low modulation up to a brightness or intensity $L_o$, the image point diameter d increases relatively slowly with increasing brightness L reaching a value $d_o$ at the brightness $L_o$. From $L_o$ to the maximum intensity or brightness $L_{max}$, the image point diameter d increases more rapidly with increasing brightness L up to a value $d_{max}$. In fact, between $L_o$ and $L_{max}$, the rate of change of d with L is more than linear.

Since the size of an image point has an important influence on the sharpness of the image, the brightness of the image point cannot be increased beyond a certain value without detrimental qualitative effects on image sharpness. On the other hand, a reduction in the brightness of an image point increases the printing time thereby reducing the output of the printing apparatus.

Figure 4:
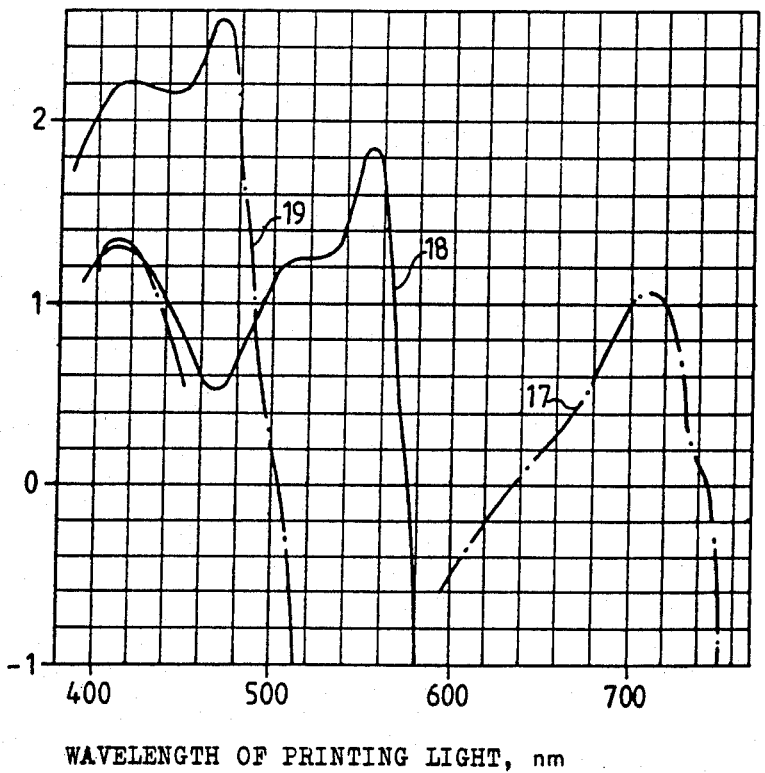
FIG. 4 shows sensitivity curves for negative color copy material suitable for use in the apparatus of FIG. 1.

FIG. 4 illustrates three sensitivity curves 17,18,19 for the copy material 12. The abscissa in FIG. 4 represents the wavelength of the printing light in nanometers while the ordinate represents the relative spectral sensitivity based on a spectrum having uniform energy. The values on the ordinate are related to the logarithm of the reciprocal of the amount of light required to achieve a constant density.

Each of the sensitivity curves 17,18,19 provides a measure of the sensitivity of the copy material 12 to light of particular wavelengths impinging the copy material 12. The curve 17 represents the sensitivity of the copy material 12 to radiation in the red region of the spectrum; the curve 18 represents the sensitivity of the copy material 12 to radiation in the green region of the spectrum; and the curve 19 represents the sensitivity of the copy material 12 to radiation in the blue region of the spectrum. It will be observed that the copy material 12 is sensitive to radiation in the portions of the spectrum corresponding to the ranges of the spectrum over which radiation is transmitted through the filters 6a,6b,6c.

Bearing in mind the logarithmic scale of the ordinate in FIG. 4, it may be seen that the sensitivity of the copy material 12 to red radiation per the curve 17 is approximately one-thirtieth of the sensitivity to blue radiation as represented by the curve 18. The sensitivity of the copy material 12 to green radiation per the curve 18 is about one-sixth of the sensitivity to blue radiation. Thus, the sensitivity of the copy material 12 to radiation in the red region of the spectrum is relatively low.

The copy material 12 is preferably CN4, Type 7 or 8, manufactured by Agfa-Gevaert AG of the Federal Republic of Germany.

Figure 5:
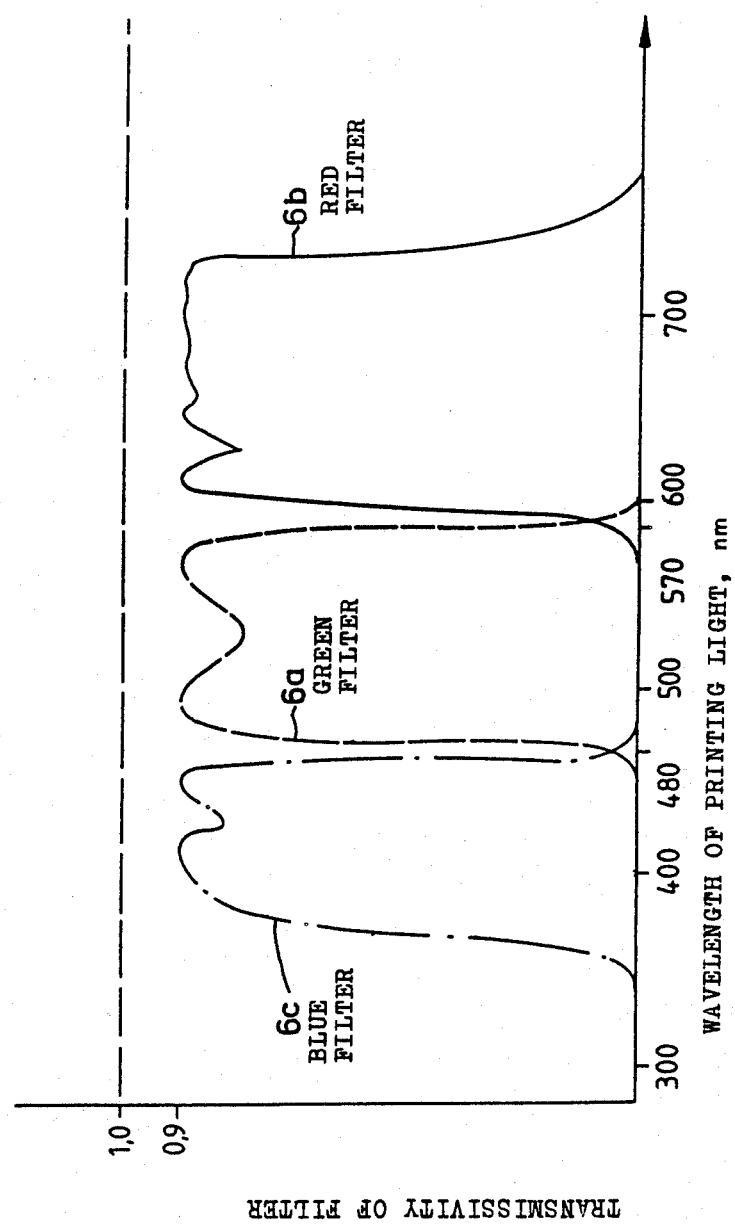
FIG. 5 illustrates transmissivity curves for color filters constituting part of the apparatus of FIG. 1.

FIG. 5 shows transmissivity curves for the printing filters 6a,6b,6c of FIG. 1. The abscissa in FIG. 5 represents the wavelength of the printing light in nanometers while the ordinate represents the transmissivity of a filter. The transmissivity curves have steep sides or flanks, and the transmissivity curves for the red and green filters 6b,6a are in abutment with one another as are the transmissivity curves for the green and blue filters 6a,6c. However, there is little overlap of the transmissivity curves for the red and green filters 6b,6a or of the transmissivity curves for the green and blue filters 6a,6c. It will be observed that the green filter 6a has high transmissivity in the green region of the spectrum while the blue filter 6c has high transmissivity in the blue region of the spectrum.

The filters 6a,6b,6c are dichroic and each of the filters 6a,6b,6c transmits radiation over a range of the spectrum corresponding to one of the portions of the spectrum for which the copy material 12 is sensitized. Dichroic filters may be manufactured by vapor-deposition of a plurality of thin quarter-wavelength laminae on a glass carrier. Depending upon the thickness of the resulting filter layer, specific wavelengths of radiation are preferentially reflected or transmitted due to interference effects. In this manner, the almost vertical sides or flanks may be achieved for the transmissivity curves.

In order to produce a particular color component of an image point on the copy material 12, the intensity of the image point on the screen 8a, as measured within the transmissivity range of the respective color filter 6a,6b,6c, must be reduced by its residual density and then multiplied by the sensitivity of the copy material 12 at the appropriate wavelength. According to the invention, a "red phosphor" emitting weakly in the green and blue regions of the spectrum is combined with filters having maximum transmissivities in precisely these regions. By virtue of this combination and the greatly differing sensitivities of the copy material 12 in the red, green and blue regions of the spectrum, the exposure times for the three primary color components, as well as the intensities of the three primary color components on the screen 8a of the cathode ray tube 8, will be almost equal for areas of the image which are neutral in color.

Control of the cathode ray tube 8 may be simplified when exposure of the copy material 12 to a given color component of an image point for the prescribed exposure time is not carried out continuously but, instead, is performed by dividing the exposure time into a plurality of discrete time intervals or printing cycles and then repeatedly exposing the copy material 12 to the given color component for the specific number of time intervals or cycles. By way of example, exposure of the copy material 12 may be carried out approximately in accordance with the norms of the television industry where the exposure time for each color component of an image is divided into discrete time intervals of 0.04 second. It may be seen that the maximum printing rate is obtained when a complete colored image is printed using a single time interval or printing cycle for each color component. However, this cannot be achieved with the current sensitivities of copy materials and the intensities of the printing tubes at television frequencies. The number of printing cycles for each of the three color components of an image lies between 5 and 10. In principle, adjustment of the amount of printing light in each of the three primary colors may be carried out based on a predetermined maximum image point size which, in turn, establishes the intensity and cathode voltage via the curve of FIG. 3. The number of printing cycles for the color component having the longest individual exposure time is then set in such a manner that, by varying the screen intensity, i.e., the intensity on the screen 8a of the cathode ray tube 8, the next highest whole number of printing cycles is obtained. Likewise, the screen intensity should be adjusted so as to establish a whole number of printing cycles for the shorter exposure times in each of the two remaining color components. Care should be taken, however, not to exceed the screen intensity corresponding to the maximum permissible image point diameter.

Figure 6:
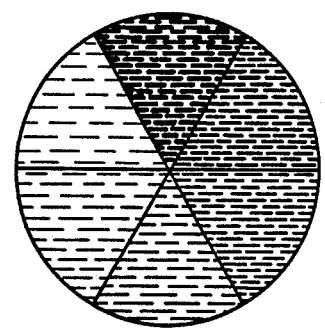
FIG. 6 shows a transparent disc with different gradations of gray for use in the apparatus of FIG. 1.

When the cathode ray tube 8 is controlled as outlined above, the sizes of the image points in the different color components may differ. The tendency for this to occur increases as the number of printing cycles decreases. This effect can lead to the formation of colored rims around the image points, particularly in the gray areas of the image. Depending upon image point size, these rims can be disturbing. Such colored rims can be avoided when fine adjustment of the amount of printing light is performed in the optical path using suitable means for controllably reducing the intensity of the printing light rather than by reduction of the intensity of an image point on the screen 8a. The shutter 10 of FIG. 1 serves as a means for the controlled reduction of the intensity of the printing light in the optical path. The shutter 10 may be replaced by a transparent disc or other element which has different gradations of gray (see FIG. 6) and can be automatically activated by the control unit 4 via an appropriate motor. When the intensity of the printing light is adjusted in the optical path, the control unit 4 calculates the degree to which the intensity of a given color component must be reduced so as to decrease the amount of radiation in this color to an extent such that the next highest whole number of printing cycles is achieved. For example, if the amount of radiation in the red component of the printing light is such that the exposure time equals some whole number of printing cycles plus one-half a printing cycle, the control unit 4 would cause the intensity of the red component to be reduced to a degree which causes the amount of red radiation to decrease by the equivalent of one-half printing cycle.

In establishing the reduction in intensity of a color component, the control unit 4 calculates an optimum intensity for the cathode ray tube 8 or, alternatively, an optimum image point size, taking into consideration image sharpness and printing rate, as well as the characteristic line or function of the cathode ray tube 8. The intensity of the color component is then reduced relative to the optimum intensity as required to arrive at the next highest whole number of printing cycles.

In order to print a colored image stored in the memory 1, an unexposed sheet 12 of copy paper is placed in the holder 12a and one of the filters 6a,6b,6c is moved into the optical path. It is assumed here that the blue filter 6c is placed in the optical path. A stream of imaging signals corresponding to the blue component of the image is now delivered from the memory 1 to the signal processor 2. Simultaneously, the required number of printing cycles for the blue component of the image at the maximum acceptable image point size is calculated based on the contrast and maximum values established in the memory 1. Any reduction in intensity which may be necessary in order to arrive at this number is converted into a command for the motor 11 which brings the shutter 10 into the proper position. Once the shutter 10 has been adjusted, the stream of signals representing the blue component of the image is converted into a series of blue images which appear on the screen 8a of the cathode ray tube 8 and are printed on the copy paper 12. Conversion of the signals into blue images and printing of such images are regulated by the clock 3. Upon completion of the exposure for the blue component of the image, the filter disc 6 is rotated 120° in order to move another filter, e.g., the red filter 6b, into the optical path. The shutter 10 is thereafter adjusted appropriately and the red component of the image is printed on the copy paper 12 via the screen 8a of the cathode ray tube 8 using the proper number of printing cycles. After the red component has been printed, the filter disc 6 is once again rotated by the motor 7 to bring the green filter 6a into the optical path and the green component of the image is printed employing the appropriate number of printing cycles. The number of printing cycles for each color component, which is a whole number, is only slightly greater than the minimum possible number of printing cycles for such color component. The minimum possible number of printing cycles, which is generally not an integer, is the number of printing cycles at maximum screen intensity and image point size.

In this manner, an optimum balance between printing output and image quality is obtained. In other words, even at high printing speeds, there is no observable reduction in image sharpness due to either image point sizes in excess of the established maximum image point size or colored rims which arise in gray areas because of different image point sizes for the three color components.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of the instant contribution to the art and, therefore, such adaptations should and are intended to be comprehended within the meaning and range of equivalence of the appended claims.

What is claimed is:

1. A method of printing a colored image, comprising the steps of generating printing light having high intensity in the red region of the spectrum and low intensity in the blue and green regions of the spectrum, the generating step including effecting luminescence of a rare-earth phosphor which emits strongly in the red region of the spectrum and weakly in the blue and green regions of the spectrum, said printing light travelling along a predetermined path; filtering said printing light in a first portion of said path, the filtering step including passing said printing light through at least one dichroic, with a first dichroic filter filter having high transmissivity in the blue or green region of the spectrum; and effecting impingement of said printing light on copy material having relatively low sensitivity in the red region of the spectrum in a second portion of said path downstream of said first portion.

2. The method of claim 1, wherein the filtering step comprises successively passing said printing light through red, green and blue filters.

3. The method of claim 1, wherein said phosphor is P 22 R or P 56.

4. The method of claim 1, wherein the generating step is performed using a single phosphor only.

5. The method of claim 1, wherein luminescence of said phosphor is effected by exciting said phosphor with a cathode-ray beam.

6. The method of claim 1, wherein the generating step includes forming red, green and blue optical image components by converting three series of electrical signals respectively corresponding to said red, green and blue optical image components into said optical image components.

7. The method of claim 6, wherein said red, green and blue optical image components are formed point-by-point.

8. The method of claim 1, wherein said copy material is a negative color copy material.

9. The method of claim 8, wherein said copy material is CN 4, Type 7 or 8, manufactured by Agfa-Gevaert AG of the Federal Republic of Germany.

10. The method of claim 1, wherein the filtering step comprises passing said printing light through at least two dichroic filters, said first dichroic filter having high transmissivity in the blue region of the spectrum and as second dichroic filter having high transmissivity in the green region of the spectrum.

11. The method of claim 1, wherein the maximum emission intensities of said phosphor in the green and blue regions, of the spectrum are at most about one-thirtieth of the maximum emission intensity of said phosphor in the red region of the spectrum.

12. An apparatus for printing a colored image, comprising means for generating printing light having high intensity in the red region of the spectrum and low intensity in the blue and green regions of the spectrum, said generating means including a rare-earth phosphor which emits strongly in the red region of the spectrum and weakly in the green and blue regions of the spectrum; means for directing the printing light along a predetermined path; means for filtering the printing light in said path, said filtering means including at least one dichroic filter, with a first dichroic filter having high transmissivity in the blue or green region of the spectrum; and means downstream of said filtering means for accommodating copy material.

13. The apparatus of claim 12, further comprising a source of three series of electrical signals respectively corresponding to red, green and blue components of a colored image, said generating means being operative to convert said signals into optical image components.

14. The apparatus of claim 13, wherein said generating means is designed to convert said signals into said optical image components point-by-point.

15. The apparatus of claim 12, wherein the maximum emission intensities of said phosphor in the green and blue regions of the spectrum are at most about one-thirtieth of the maximum emission intensity of said phosphor in the red region of the spectrum.

16. The apparatus of claim 12, wherein said phosphor is P 22 R or P 56.

17. The apparatus of claim 12, wherein said generating means further comprises a cathode-ray tube having a screen, said phosphor being coated on said screen.

18. The apparatus of claim 12, wherein said directing means comprises an objective.

19. The apparatus of claim 12, further comprising copy material in said accommodating means.

20. The apparatus of claim 19, wherein said copy material is negative color copy material.

21. The apparatus of claim 19, wherein said copy material has relatively low sensitivity in the red region of the spectrum.

22. The apparatus of claim 12, wherein said filtering means includes at least two dichroic filters, said first dichroic filter having high transmittivity in the blue region of the spectrum and a second dichroic filter having high transmittivity in the green region of the spectrum.

23. The apparatus of claim 12, wherein said filtering means comprises red, green, and blue filters which are selectively movable into said path.

24. The apparatus of claim 23, wherein each of said filters is dichroic.

25. The apparatus of claim 23, wherein each of said filters comprises a carrier carrying a vapor-deposited layer of a filter substance.

26. The apparatus of claim 23, wherein each of said filters transmits radiation over a respective predetermined range of the spectrum, said filters being designed such that said ranges are in abutment but substantially free of overlap.

27. The apparatus of claim 26, further comprising color copy material in said accommodating means, said copy material being sensitive to radiation in portions of the spectrum corresponding to said ranges.

28. The apparatus of claim 12, wherein said generating means contains a single phosphor only.

29. A method of printing a colored image, comprising the steps of generating printing light having high intensity in the red region of the spectrum and low intensity in the blue and green regions of the spectrum, the generating step being performed using an imaging device having a characteristic function, and said printing light having red, green and blue components and travelling along a predetermined path; filtering said printing light in a first portion of said path, the filtering step including passing said printing light through at least one filter, with one filter having high transmissivity in the blue or green region of the spectrum; establishing an optimum intensity of said printing light with respect to image sharpness, printing speed and said characteristic function; reducing the intensity of said printing light below said optimum intensity; and effecting impingement of said printing light on copy material having relatively low sensitivity in the red region of the spectrum in a second portion of said path downstream of said first portion, the impingement step being performed individually for said red, green and blue components in such a manner that said copy material receives a predetermined amount of each component, and the impingement step being carried out by exposing said copy material to each component for a plurality of spaced time intervals, the reducing step being performed in such a manner as to permit exposure of said copy material to each component to be completed in an integral number of time intervals.

30. An apparatus for printing a colored image, comprising means for generating printing light having high intensity in the red region of the spectrum and low intensity in the blue and green regions of the spectrum; means for directing the printing light along a predetermined path; means for filtering the printing light in said path; means downstream of said filtering means for accommodating copy material; and means for regulating the intensity of the printing light in said path.

31. The apparatus of claim 30, wherein said regulating means comprises an automatically adjustable shutter.

32. The apparatus of claim 30, wherein said regulating means comprises an automatically adjustable element having different gradations of gray.

* * * * *